United States Patent
Sondhi

(10) Patent No.: US 10,212,341 B2
(45) Date of Patent: Feb. 19, 2019

(54) MOBILE ELECTRONIC DEVICE WITH MULTIPLE CAMERAS

(71) Applicant: Amit Sondhi, New York, NY (US)

(72) Inventor: Amit Sondhi, New York, NY (US)

( * ) Notice: Subject to any disclaimer, the term of this patent is extended or adjusted under 35 U.S.C. 154(b) by 0 days.

(21) Appl. No.: 15/356,990

(22) Filed: Nov. 21, 2016

(65) Prior Publication Data
US 2017/0150046 A1    May 25, 2017

Related U.S. Application Data

(60) Provisional application No. 62/258,248, filed on Nov. 20, 2015.

(51) Int. Cl.
| | |
|---|---|
| *H04N 5/232* | (2006.01) |
| *G06T 11/60* | (2006.01) |
| *H04M 1/02* | (2006.01) |
| *H04N 5/225* | (2006.01) |

(52) U.S. Cl.
CPC ......... *H04N 5/23238* (2013.01); *G06T 11/60* (2013.01); *H04M 1/0264* (2013.01); *H04N 5/2258* (2013.01); *H04N 5/232* (2013.01); *H04N 5/23293* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 2014/0098197 A1* | 4/2014 | Geris | H04N 13/0242 348/48 |
| 2015/0092066 A1* | 4/2015 | Geiss | H04N 5/2258 348/180 |
| 2016/0381289 A1* | 12/2016 | Kim | H04N 5/23222 348/38 |

* cited by examiner

*Primary Examiner* — Eileen M Adams
(74) *Attorney, Agent, or Firm* — Tarter Krinsky & Drogin LLP

(57) ABSTRACT

Exemplary embodiments of a mobile electronic device with multiple cameras are provided. In one embodiment, an apparatus is provided comprising a mobile electronic device having a first side and a second opposing side, a first camera on the first side of the mobile electronic device, and a second camera on the first side of the mobile electronic device, wherein the first camera is configured to obtain a first image and the second camera is configured to obtain a second image simultaneously, wherein the second image partially overlaps the first image, and wherein the mobile electronic device merges the first image and the second image to create an image which comprises at least a portion of the first image and the second image.

12 Claims, 1 Drawing Sheet

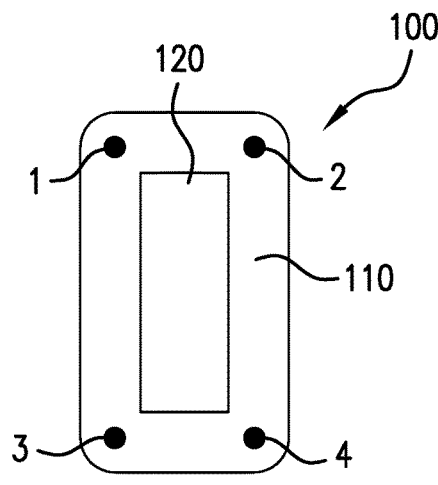
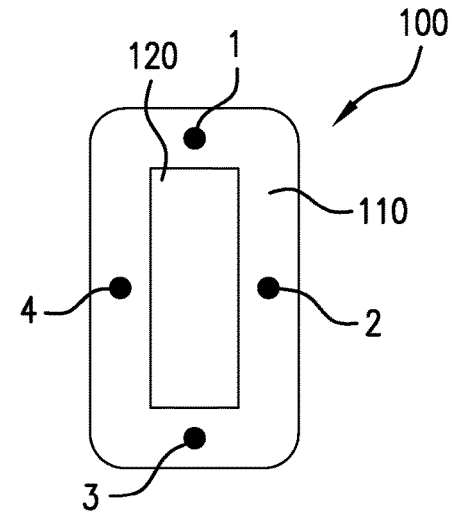
FIG.1   FIG.2
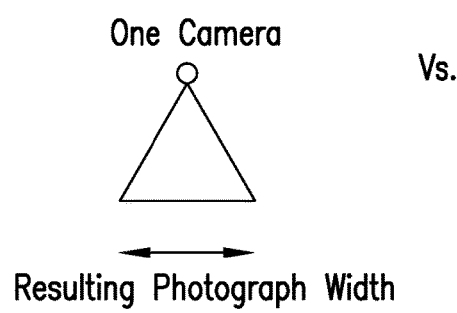
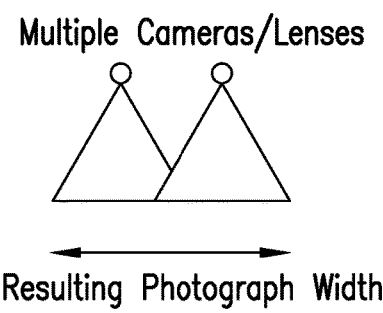
FIG.3

MOBILE ELECTRONIC DEVICE WITH MULTIPLE CAMERAS

FIELD OF THE DISCLOSURE

The present disclosure relates to exemplary embodiments of a mobile electronic device, and more particularly, to exemplary embodiments of a mobile electronic device with multiple cameras.

BACKGROUND OF THE DISCLOSURE

The present disclosure addresses a common issue presented with a user's inability to adequately capture a wide-angle photograph with an electronic device, which results in cutting off a subject, object, landscape or any part of the photograph the user is trying to capture.

Nearly all electronic devices, cell phones, smartphones, smart watches, phablets, and tablets, have digital cameras. Many users tend to take portraits holding or using their own device while including themselves in the photo ("selfie"), either of themselves alone or a group of individuals, often times with an emphasis on a landscape/background.

The average electronic device, however, is extremely limited in its ability to take wide-angle photography (i.e., adequate selfies). In an effort to lure selfie enthusiasts, manufactures are replacing their respective electronic device's standard lens with a wide-angle lens to capture a greater viewing area. Although the wide-angle lens, traditionally utilized for architectural, interior and landscape photography, can capture a greater area, such lenses create image distortion and are not beneficial under most photographic situations.

SUMMARY OF THE DISCLOSURE

At least some of the above described problems can be addressed by exemplary embodiments of the apparatuses and methods according to the present disclosure. For example, using such exemplary embodiments, it is possible to provide an apparatus comprising a mobile electronic device having a first side and a second opposing side, a first camera on the first side of the mobile electronic device, and a second camera on the first side of the mobile electronic device, wherein the first camera is configured to obtain a first image and the second camera is configured to obtain a second image simultaneously, wherein the second image partially overlaps the first image, and wherein the mobile electronic device merges the first image and the second image to create an image which comprises at least a portion of the first image and the second image. The mobile electronic device can be one of a cellular phone, smartphone, tablet, phablet, laptop, digital camera or watch.

In some exemplary embodiments, the apparatus can further comprise one or more flashes corresponding to the first and second cameras for obtaining the first or second image. The apparatus can further comprise a touch screen display on the first side of the mobile electronic device. The apparatus can further comprise a selection mechanism configured to activate or deactivate the first camera and the second camera. In some exemplary embodiments, the selection mechanism can allow a user to activate either the first camera to obtain the first image or the second camera to obtain the second image, or the first camera and the second camera to obtain the first image and the second image simultaneously.

In some exemplary embodiments, the apparatus can further comprise a third camera on the first side of the mobile electronic device, wherein the third camera is configured to obtain a third image simultaneously with the first image and the second image, wherein the third image at least partially overlaps with one of: (1) the first image; (2) the second image; or (iii) the first and second images, and wherein the mobile electronic device merges the first image, the second image and the third image to create an image which comprises a portion of the first image, the second image and the third image.

In some exemplary embodiments, the apparatus can further comprise a fourth camera on the first side of the mobile electronic device, wherein the fourth camera is configured to obtain a fourth image simultaneously with the first image, the second image and the third image, wherein the fourth image at least partially overlaps with at least one of: (1) the first image; (2) the second image; (3) the third image; or (iii) any combination of the first, second and third images, and wherein the mobile electronic device merges the first image, the second image, the third image and the fourth image to create an image which comprises a portion of the first image, the second image, the third image and the fourth image.

The apparatus can further comprise a selection mechanism configured to activate or deactivate the first camera, the second camera, the third camera and the fourth camera. In some exemplary embodiments, the selection mechanism can allow a user to activate any combination of the first camera, the second camera, the third camera and the fourth camera to obtain simultaneous images from any combination of the first camera, the second camera, the third camera and the fourth camera.

These and other objects, features and advantages of the present disclosure will become apparent upon reading the following detailed description of embodiments of the present disclosure, when taken in conjunction with the appended claims. It should be understood that the detailed description and specific examples, while indicating the preferred or exemplary embodiments of the disclosure, are intended for purposes of illustration only and are not intended to limit the scope of the disclosure.

BRIEF DESCRIPTION OF THE DRAWINGS

The foregoing and other exemplary objects of the present disclosure will be apparent upon consideration of the following detailed description, taken in conjunction with the accompanying exemplary drawings and claims, in which like reference characters refer to like parts throughout, and in which:

FIG. 1 is an illustration of a mobile electronic device with multiple cameras according to an exemplary embodiment of the present disclosure;

FIG. 2 is an illustration of a mobile electronic device with multiple cameras in different locations according to an exemplary embodiment of the present disclosure; and FIG. 3 is an illustration of a photograph using multiple cameras versus a single camera according to an exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure.

DETAILED DESCRIPTION OF EXEMPLARY EMBODIMENTS OF DISCLOSURE

The present disclosure describes exemplary embodiments of an electronic device that can adequately capture a wide-angle photograph and can provide versatility in capturing other types of photographs using a combination of lenses and sensors.

A digital cameras can have a digital imaging chip, sensor (s), lens(es), audio sensor, and a flash. In the exemplary embodiments below, each digital camera is shown in a specific location. The software and components necessary for each digital camera to function can be incorporated within the electronic device. In some exemplary embodiments, each digital camera can have its own flash, or multiple cameras can use one flash, or more than one flash at various locations on the electronic device, and the electronic device of the present disclosure is not limited to any particular configuration or number of lenses and flashes, and corresponding components.

Exemplary embodiments of the mobile electronic device of the present disclosure will now be described with reference to the figures. The following description of the various embodiments is merely exemplary in nature and is in no way intended to limit the scope of the disclosure, its application, or uses.

FIG. 1 is an illustration of a mobile electronic device with multiple cameras according to an exemplary embodiment of the present disclosure. The electronic device can be a cellular phone, smartphone, tablet, phablet, laptop, computer, digital camera, watch, or other electronic device and is not limited to any particular electronic device, and can have a multiple camera system.

As reference in the figures, each of cameras 1-4 can represent an independent camera system (including its own imaging chip, sensor, lens, and/or flash) or a lens connected to a camera system within the device. One flash may be used on the electronic device or multiple flashes for any number of cameras (e.g., one for each camera, one for all cameras, or one for a set of camera (e.g., one for each pair of cameras)). The multiple camera system can have one or more cameras obtain an independent image simultaneously with the others. The benefit of having multiple cameras permits a user to obtain different types of images and provides versatility depending on the circumstances. As shown in FIG. 1, the cameras 1-4 can be stretched to the outer perimeter of the device to maximize field of view and increase the length and width of the images.

FIG. 1 provides for four cameras 1-4 on a side 110 of the electronic device 100. The side 110 can be a front face or back face of the electronic device 100. A display 120, such as a touch screen display, can be provided on the side 110 of the electronic device 100, which can be a front or back face of the electronic device 100. The cameras 1-4 can be provided on the same side as the display, opposite side, or both.

It is understood that any number of cameras can be used or activated on various locations according to the present disclosure. For example, in some exemplary embodiments, only cameras 1 and 2 can be provided on a side 110 of the electronic device 110. In some exemplary embodiments, only cameras 3 and 4 can be provided on a side 110 of the electronic device 110. In some exemplary embodiments, only cameras 1 and 3, or 2 and 4, can be provided on a side 110 of the electronic device 110. In some exemplary embodiments, cameras 1 and 4, or 2 and 3 (e.g., a diagonal pattern), can be provided on a side 110 of the electronic device 110, or any other combination of two or more cameras can be provided. Various configurations of the numbers as well as locations of the cameras can be provided. For example, as shown in FIG. 2, the cameras 1-4 can be located along a center portion of each side of the electronic device 100 rather than at the edges as shown in FIG. 1. In some exemplary embodiments, cameras can be provided along edge and center portions of the electronic device. The present disclosure is not limited to any particular number of cameras, location on the electronic device or any particular side of the electronic device. Various numbers and combinations of cameras can be used, on either side of the electronic device, as explained below with reference to FIG. 1.

Any of the cameras on either side of the electronic device 100 can be activated or deactivated. An activated camera is a camera that is on and ready to capture a photograph. A deactivated camera is a camera that is placed into standby mode or turned off. Any of the cameras on the electronic device 100 can be activated or deactivated for each photograph taken.

Each of the cameras may utilize a gyroscope, accelerometer, proximity sensor, and ambient light sensor, along with other sensors, to determine orientation between horizontal and vertical photography. Each camera can take an individual and unique photograph that will be used in the aggregated or panoramic wide-angle photograph. Each camera is configured to take an image simultaneously as the other cameras for processing into a single image. In order for any program to be able stitch multiple images together, the images overlap each other by a certain margin, so that alignment points are properly identified. The alignment points serve as flags for stitching algorithms that seamlessly merge the images and may cut out parts of the image. The overlap margin can be but is not limited to approximately 20%-50% overlap.

Each camera may automatically adjust its settings, such as mode, focus, ISO, aperture and shutter speed, metering, lens focal length, white balance, and file type (e.g., RAW or JPEG), prior to taking an image. These settings can be adjusted by the user prior to capturing the image. Once the independent photographs are captured, the user may select the photographs to be stitched or merged together. At that time, the internal software contained within the device can stitch or merge the photographs using computational photography. Computational photography or computational imaging refers to digital image capture and processing techniques that use digital computation instead of optical processes. Computational photography can improve the capabilities of a camera, or introduce features that were not possible at all with film based photography, or reduce the cost or size of camera elements. Examples of computational photography include in-camera computation of digital panoramas, high-dynamic-range images, and light field cameras. Light field cameras use novel optical elements to capture three dimensional scene information which can then be used to produce 3D images, enhanced depth-of-field, and selective de-focusing (or "post focus"). Enhanced depth-of-field reduces the need for mechanical focusing systems. All of these features may use computational imaging techniques.

Photo stitching is the process of combining several images with overlapping fields of view to reproduce a sweeping landscape. The software finds distinctive features common to multiple photographs. These areas are known as control points, and include such things as exceptionally bright pixels, edges, and corners. The stitching software can also straighten out perspective effects and lens distortions by stretching and squeezing each image to make for a better fit to the control points. It can also correct for vignetting—the darkening of individual images in the corners.

Scenario 1:

In one exemplary embodiment, camera 1 can obtain an image. First, the electronic device can be automatically or manually set to record the image using camera 1. The electronic device 100 can automatically obtain this setting, such as a default setting, or the user within the settings menu can manually select it. The user can look through the viewfinder or screen of the electronic device 100 and press the button (or touch the screen in the appropriate area) to capture the image. The image would be processed by the existing hardware and software and displayed to the user, and can be saved. This setting can be for everyday image capturing.

Scenario 2:

In one exemplary embodiment, the image can be obtained using cameras 1 and 2, or 3 and 4. The electronic device 100 can be either automatically or manually be set to capture the image using only cameras 1 and 2, or 3 and 4. The device can automatically obtain this setting by utilizing its gyroscope or other embedded technology to obtain its orientation. That is, the device can recognize its position and automatically activate the appropriate cameras. In some exemplary embodiments, the user can override the automatic settings and manually select cameras 1 and 2, or 3 and 4, to capture the image. The user can also manually override the system and activate any and all of the cameras 1-4. This can provide the user with the ability to obtain varying image length and width under the circumstances.

After cameras 1 and 2, or 3 and 4, are activated, the user can observe the soon-to-be image on the device's screen or through a viewfinder. This single image can be a digitally merged product of the two images within cameras 1 and 2 field of vision or cameras 3 and 4 field of vision (similar to a panoramic). Once the user presses a button (or touches the screen in the appropriate area) to capture the image, both cameras 1 and 2, or 3 and 4, can simultaneously and independently capture their own unique images. The two images can partially overlap due to a limited field (angle) of view but are not identical images. The two images are processed and digitally merged using the existing hardware and embedded software on the device, creating one seamless image. The resulting image would be wider than using just one camera alone. This procedure can be compliant with existing software and hardware embedded on electronic devices using, e.g, iOS, Android, Windows, Unix, Linux or any other operating system. This setting can be for everyday image capturing, and can also provide the benefit of providing a slightly wider image than conventional devices.

Scenario 3:

In one exemplary embodiment, the image can be obtained using cameras 1 and 4, or 2 and 3. The electronic device 100 can be either automatically or manually be set to capture the image using only cameras 1 and 4, or 2 and 3. The device can automatically obtain this setting by utilizing its gyroscope or other embedded technology to obtain its orientation. That is, the device can recognize its position and automatically activate the appropriate cameras. In some exemplary embodiments, the user can override the automatic settings and manually select cameras 1 and 4, or 2 and 3, to capture the image. The user can also manually override the system and activate any and all of the cameras 1-4. This can provide the user with the ability to obtain varying image length and width under the circumstances.

After cameras 1 and 4, or 2 and 3, are activated, the user can observe the soon-to-be image on the device's screen or through a viewfinder. This single image can be a digitally merged product of the two images within cameras 1 and 4 field of vision or cameras 2 and 3 field of vision (similar to a panoramic). Once the user presses a button (or touches the screen in the appropriate area) to capture the image, both cameras 1 and 4, or 2 and 3, can simultaneously and independently capture their own unique images. The two images can partially overlap due to a limited field (angle) of view but are not identical images. The two images are processed and digitally merged using the existing hardware and embedded software on the device, creating one seamless image. The resulting image would be wider than using just one camera alone. This procedure can be compliant with existing software and hardware embedded on electronic devices using, e.g., iOS, Android, Windows, Unix, Linux or any other operating system. This setting can be for everyday image capturing, and can also provide the benefit of providing a slightly wider image than conventional devices.

Scenario 4:

In one exemplary embodiment, the image can be obtained using cameras 1 and 3, or 2 and 4. The electronic device can be automatically or manually be set to capture the image using cameras 1 and 3, or 2 and 4. The device can automatically obtain this setting by utilizing its gyroscope or other embedded technology to obtain its orientation. That is, the device can recognize its position and automatically activate the appropriate cameras. The user can override the automatic settings and manually select cameras 1 and 3, or 2 and 4, to capture the image. The user can also manually override the system and activate any and all of the cameras 1-4. This provides the user with the ability to obtain varying image length and width.

After cameras 1 and 3, or 2 and 4, are activated, the user can observe the soon-to-be image on the device's screen or through a viewfinder. This single image is the digitally merged product of the two images within cameras 1 and 3 field of vision or cameras 2 and 4 field of vision (similar to a panoramic). Once the user presses a button (or touches the screen in the appropriate area) to capture the image, both cameras 1 and 3, or 2 and 4, simultaneously and independently capture their own unique images. The two images can partially overlap due to a limited field (angle) of view but are not identical images. The two images are processed and digitally merged using the existing hardware and embedded software on the device, creating one seamless image. The resulting image would be wider than using just one camera alone. This procedure would be compliant with existing software and hardware embedded on electronic devices using, e.g., iOS, Android, Windows, Unix, Linux or any other operating system. This setting can be optimal for wide-angle image capturing.

Scenario 5:

In one exemplary embodiment, the image can be obtained using all of the cameras 1-4, or any combination of 1-4. The electronic device can either automatically or manually be set to capture the image using cameras 1-4. The device can automatically obtain this setting by utilizing its gyroscope or other embedded technology to obtain its orientation. The device can recognize its position and automatically activate the appropriate cameras. Alternatively, the user can override the automatic settings and manually select cameras 1-4 to capture the image. The user can also manually override the system and activate any and all of the cameras. This can provide the user with the ability to obtain varying image length and width under the circumstances.

After cameras 1-4 are activated, the user can observe the soon-to-be image on the device's screen or through a viewfinder. This single image is the digitally merged product of the two images within cameras 1-4 field of vision (similar to a panoramic). Once the user presses a button (or touches the screen in the appropriate area) to capture the image, cameras 1-4 simultaneously and independently capture their own unique images. The four images are meant to partially overlap due to a limited field (angle) of view but are not identical images. The four images are processed and digitally merged using the existing hardware and embedded software on the device, creating one seamless image. The resulting image would be wider than using just one camera alone. This procedure would be compliant with existing software and hardware embedded on electronic devices using, e.g., iOS, Android, Windows, Unix, Linux or any other operating system. This setting can be optimal for wide-angle image capturing with the ability to capture a significantly larger overall image.

FIG. 2 is an illustration of a mobile electronic device with multiple cameras in different locations according to an exemplary embodiment of the present disclosure. In these exemplary embodiments, the cameras 1-4 are located along a center portion of each side. Various numbers and combinations of cameras can be used, as explained below with reference to FIG. 2.

Scenario 1:

In one exemplary embodiment, camera 1 can obtain an image. The electronic device can automatically or be manually set to record the image using camera 1. The device can automatically obtain this setting, such as a default setting, or the user within the settings menu can manually select it. The user can then look through the viewfinder or screen of the electronic device and press the button (or touch the screen in the appropriate area) to capture the image. The image would be processed by the existing hardware and software and displayed to the user. It can also be saved. This setting can be optimal for everyday image capturing.

Scenario 2:

In one exemplary embodiment, the image can be obtained using cameras 2 and 4. First, the electronic device can either automatically or manually be set to capture the image using cameras 2 and 4 only. The device can automatically obtain this setting by utilizing its gyroscope or other embedded technology to obtain its orientation. That is, the device can recognize its position and automatically activate the appropriate cameras. The user can override the automatic settings and manually select cameras 2 and 4 to capture the image. The user can also manually override the system and activate any and all of the cameras. This provides the user with the ability to obtain varying image length and width.

After cameras 2 and 4 are activated, the user can observe the soon-to-be image on the device's screen or through a viewfinder. This single image is the digitally merged product of the two images within cameras 2 and 4 field of vision (similar to a panoramic). Once the user presses a button (or touches the screen in the appropriate area) to capture the image, both cameras 2 and 4 simultaneously and independently capture their own unique images. The two images are meant to partially overlap due to a limited field (angle) of view but are not identical images. The two images are processed and digitally merged using the existing hardware and embedded software on the device, creating one seamless image. The resulting image would be wider than using just one camera alone. This procedure would be compliant with existing software and hardware embedded on electronic devices using, e.g., iOS, Android, Windows, Unix, Linux or any other operating system. This setting can be optimal for everyday image capturing, and can also provide the benefit of providing a slightly wider image than conventional devices.

Scenario 3:

In one exemplary embodiment, the image can be obtained using cameras 1 and 3. The electronic device can either automatically or manually be set to capture the image using either cameras 1 and 3 only. The device can automatically obtain this setting by utilizing its gyroscope or other embedded technology to obtain its orientation. That is, the device can recognize its position and automatically activate the appropriate cameras. Alternatively, the user can override the automatic settings and manually select cameras 1 and 3 to capture the image. The user can also manually override the system and activate any and all of the cameras. This can provide the user with the ability to obtain varying image length and width under the circumstances.

After cameras 1 and 3 are activated, the user can observe the soon-to-be image on the device's screen or through a viewfinder. This single image is the digitally merged product of the two images within cameras 1 and 3 field of vision (similar to a panoramic). Once the user presses a button (or touches the screen in the appropriate area) to capture the image, both cameras 1 and 3 simultaneously and independently capture their own unique images. The two images are meant to partially overlap due to a limited field (angle) of view but are not identical images. The two images are processed and digitally merged using the existing hardware and embedded software on the device, creating one seamless image. The resulting image would be wider than using just one camera alone. This procedure would be compliant with existing software and hardware embedded on electronic devices using, e.g., iOS, Android, Windows, Unix, Linux or any other operating system. This setting can be optimal for wide-angle image capturing.

Scenario 4:

In one exemplary embodiment, the image can be obtained using all of the cameras 1-4, or any combination of 1-4. The electronic device can either automatically or manually be set to capture the image using cameras 1-4. The device can automatically obtain this setting by utilizing its gyroscope or other embedded technology to obtain its orientation. That is, the device can recognize its position and automatically activate the appropriate cameras. Alternatively, the user can override the automatic settings and manually select cameras 1-4 to capture the image. The user can also manually override the system and activate any and all of the cameras. This can provide the user with the ability to obtain varying image length and width under the circumstances.

After cameras 1-4 are activated, the user can observe the soon-to-be image on the device's screen or through a viewfinder. This single image is the digitally merged product of the two images within cameras 1-4 field of vision (similar to a panoramic). Once the user presses a button (or touches the screen in the appropriate area) to capture the image, cameras 1-4 simultaneously and independently capture their own unique images. The four images are meant to partially overlap due to a limited field (angle) of view but are not identical images. The four images are processed and digitally merged using the existing hardware and embedded software on the device, creating one seamless image. The resulting image would be wider than using just one camera alone. This procedure would be compliant with existing software and hardware embedded on electronic devices using, e.g., iOS, Android, Windows, Unix, Linux or any other operating system. This setting can be optimal for wide-angle image capturing with the ability to capture a significantly larger overall image.

FIG. 3 is an illustration of a photograph using multiple cameras/lenses versus a single camera according to an exemplary embodiment of the present disclosure. As illustrated, using multiple cameras (two or more cameras) results in a larger photograph width than with one camera.

The exemplary embodiments of the present disclosure can address wide-angle photography (or the selfie) in a straightforward manner by adding multiple digital cameras to electronic devices. Additional cameras can be added on the front or back or sides of the electronic device in various locations. In some exemplary embodiments, the cameras can be at opposite corners from each other or at a far distance on the electronic device to maximize the viewing area and increase a depth of field. This can help a user to satisfactorily capture more subjects, landscape, or background the user intends to capture.

In some exemplary embodiments, the user can choose which camera(s) on the electronic device to use for a specific photograph. For example, when preparing to capture an image, the electronic device can automatically obtain its orientation using its gyroscope or other embedded technology. Once orientation is obtained, the electronic device can automatically activate specific cameras to capture the image, or can allow the user to select the specific cameras to capture the image. The user can use the device's automatic settings or override the automatic settings and manually activate the cameras. This provides the user with the ability to obtain different images with varying field of view and depth.

In some exemplary embodiments, once the specific cameras are set to capture an image, each camera can simultaneously capture its own independent and unique image. The resulting images would partially overlap with each other based upon which additional camera was activated. These images would be digitally merged using embedded software on the device, creating one seamless wide-angle image.

For example, if the user held an elongated electronic device vertically (smaller length on a top and bottom side), it can automatically activate a camera along the top and bottom edge to capture a unique image. Similarly, if the user held the elongated electronic device horizontally (longer length on a top and bottom side), each camera along the longer edge would capture a unique image. Under each scenario, the resulting image would be a wide-angle photograph.

Additionally, in some exemplary embodiments, different types of lenses (wide angle, standard, telephoto, or zoom) can be utilized to maximize the photographic capabilities of the device. For example, two wide-angle lenses could be utilized along the longer sides of the device, while a normal lens could be positioned on the smaller side of the device. 3-dimensional lenses can also be used to capture 3-dimensional images.

Various other considerations can also be addressed in the exemplary applications described according to the exemplary embodiments of the present disclosure. Different numbers of cameras and locations of the cameras can be provided on the electronic device depending on the size and configuration of the device. For example, an electronic device with a screen on one side (e.g., tablet, smartphone) can have the cameras located around an outer periphery of the front side of the electronic device, whereas the back side of the electronic device can have the locations across any portion of the back side as needed. Each side of the electronic device can be flat, or can have edges/ridges so that one or more cameras are placed on side/edge surfaces rather than only on opposite flat sides. Other hardware/software as needed for each camera can be provided on or within the electronic device as needed.

Different types of photographs, including three-dimensional photographs, can also be provided for. In some exemplary embodiments, various lenses can be provided, such as but not limited to normal, ultra-wide (e.g., for landscape, architecture, interior), wide (e.g, a large group of people or a landscape), telephoto (e.g., subjects you can't get close to such as in sports or wildlife, portraits, landscapes), superzoom (e.g., cover all situations from close to far), macro (e.g., close-up shots), stereoscopic, and three-dimensional. According to the present disclosure, if a user held the electronic device vertically (i.e., smaller side on top and bottom), the electronic device can automatically activate the camera along the top and bottom edges to capture a unique image. Similarly, if the user held the electronic device horizontally (i.e., longer sides on the top and bottom), each camera along the longer edges would capture a unique image. Under each scenario, the resulting image would be a wide-angle photograph.

In some exemplary embodiments, different types of lenses could be utilized (e.g., wide angle, standard, telephoto, or zoom) to maximize the electronic device's photographic capabilities. For example, two wide-angle lenses could be utilized along the longer sides of the device, while a normal lens could be positioned on the smaller side of the device. Three-dimensional lenses can also be utilized to capture three-dimensional images.

The exemplary embodiments of the integrated system of the present disclosure can be used in various configurations and in different systems. The electronic device can be a mobile electronic device, including cellular phones, smartphones, tablets, laptops, computers, digital cameras or watches. Various computing arrangements can be provided, having a processor(s) configured or programmed to perform the exemplary steps and/or procedures of the exemplary embodiments of the present disclosure described above. Various data described above can be stored in various storage arrangements (e.g., hard drives, memory devices, such as RAM, ROM, memory stick, floppy drive, other tangible computer-accessible medium, etc.). Computer processor(s) can access the storage arrangement(s) to execute a computer program or a set of instructions (stored on or in the storage arrangement) which can perform the procedures according to the exemplary embodiments of the methods and systems of the present disclosure.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly shown or described herein, embody the principles of the disclosure and are thus within the spirit and scope of the disclosure. The disclosures of all documents and publications cited herein are hereby incorporated herein by reference in their entireties.

What is claimed is:
1. An apparatus comprising:
   a mobile electronic device having a first side and a second opposing side;
   a first camera on the first side of the mobile electronic device; and a second camera on the first side of the mobile electronic device;

wherein the first camera is configured to obtain a first image having a first width and the second camera is configured to obtain a second image having a second width simultaneously, wherein the second image is unique from and partially overlaps the first image; and wherein the mobile electronic device merges the first image obtained by the first camera and the second image obtained by the second camera to create a merged image which comprises at least a portion of the first image and a portion of the second image, wherein the merged image has a width greater than the first width of the first image and greater than the second width of the second image.

2. The apparatus of claim 1, wherein the mobile electronic device is one of a cellular phone, smartphone, tablet, phablet, laptop, digital camera or watch.

3. The apparatus of claim 1, further comprising:
one or more flashes corresponding to the first and second cameras for obtaining the first or second image.

4. The apparatus of claim 1, further comprising:
a touch screen display on the first side of the mobile electronic device.

5. The apparatus of claim 1, further comprising:
a selection mechanism configured to activate or deactivate the first camera and the second camera.

6. The apparatus of claim 5, wherein the selection mechanism allows a user to activate either the first camera to obtain the first image or the second camera to obtain the second image, or the first camera and the second camera to obtain the first image and the second image simultaneously.

7. The apparatus of claim 1, further comprising:
a third camera on the first side of the mobile electronic device;

wherein the third camera is configured to obtain a third image having a third width simultaneously with the first image and the second image, wherein the third image is unique from and at least partially overlaps with one of: (1) the first image; (2) the second image; or (iii) the first and second images; and wherein the mobile electronic device merges the first image, the second image and the third image obtained by the third camera to create the merged image which comprises at least a portion of the first image, the second image and the third image, wherein the merged image has a width greater than the third width of the third image.

8. The apparatus of claim 7, further comprising:
a fourth camera on the first side of the mobile electronic device;

wherein the fourth camera is configured to obtain a fourth image having a fourth width simultaneously with the first image, the second image and the third image, wherein the fourth image is unique from and at least partially overlaps with at least one of: (1) the first image; (2) the second image; (3) the third image; or (iii) any combination of the first, second and third images; and wherein the mobile electronic device merges the first image, the second image, the third image and the fourth image obtained by the fourth camera to create the merged image which comprises at least a portion of the first image, the second image, the third image and the fourth image, wherein the merged image has a width greater than the fourth width of the fourth image.

9. The apparatus of claim 8, further comprising:
a selection mechanism configured to activate or deactivate the first camera, the second camera, the third camera and the fourth camera.

10. The apparatus of claim 9, wherein the selection mechanism allows a user to activate any combination of the first camera, the second camera, the third camera and the fourth camera to obtain simultaneous images from any combination of the first camera, the second camera, the third camera and the fourth camera.

11. The apparatus of claim 10, wherein the first, second, third and fourth cameras are provided on corners on the first side of the mobile electronic device.

12. The apparatus of claim 1, wherein the first and second cameras are provided on corners on the first side of the mobile electronic device.

* * * * *